(12) United States Patent
Yasukawa

(10) Patent No.: US 9,229,376 B2
(45) Date of Patent: Jan. 5, 2016

(54) HIGH VOLTAGE POWER SUPPLY AND IMAGE FORMING APPARATUS

(75) Inventor: Kouji Yasukawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 191 days.

(21) Appl. No.: 13/598,404

(22) Filed: Aug. 29, 2012

(65) Prior Publication Data

US 2013/0064565 A1 Mar. 14, 2013

(30) Foreign Application Priority Data

Sep. 13, 2011 (JP) ................................. 2011-199738
Jul. 11, 2012 (JP) ................................. 2012-155603

(51) Int. Cl.
*G03G 15/00* (2006.01)
*G03G 15/16* (2006.01)
*H02M 7/10* (2006.01)

(52) U.S. Cl.
CPC ........ *G03G 15/1675* (2013.01); *G03G 15/5004* (2013.01); *G03G 15/80* (2013.01); *H02M 7/103* (2013.01)

(58) Field of Classification Search
CPC .......... G03G 15/1675; G03G 15/5004; G03G 15/80; G03G 15/1605; G03G 2215/00978
USPC ........... 399/88, 38, 66, 71, 75, 310, 314, 343, 399/354
See application file for complete search history.

(56) References Cited

U.S. PATENT DOCUMENTS

| 4,896,192 | A | * | 1/1990 | Kinoshita | ........................ 399/66 |
| 5,567,997 | A | * | 10/1996 | Suzuki et al. | ................. 307/127 |
| 7,265,479 | B2 | | 9/2007 | Yamaguchi et al. | |
| 7,425,789 | B2 | | 9/2008 | Yasukawa et al. | |
| 7,548,708 | B2 | | 6/2009 | Nagasaki et al. | |
| 7,898,149 | B2 | | 3/2011 | Yasukawa | |
| 2003/0185582 | A1 | * | 10/2003 | Inukai | ............................ 399/46 |
| 2004/0213598 | A1 | * | 10/2004 | Mori et al. | .................... 399/101 |
| 2011/0110677 | A1 | * | 5/2011 | Uehara | ........................... 399/50 |
| 2011/0158675 | A1 | * | 6/2011 | Inukai | ............................. 399/88 |

FOREIGN PATENT DOCUMENTS

JP 2000-350469 A 12/2000
JP 2008-309904 A 12/2008

OTHER PUBLICATIONS

Chinese Office Action dated Nov. 15, 2014 from counterpart Chinese Application No. 201210338661.6.

* cited by examiner

*Primary Examiner* — Benjamin Schmitt
(74) *Attorney, Agent, or Firm* — Fitzpatrick, Cella, Harper & Scinto

(57) ABSTRACT

A high voltage power supply including a first high voltage output unit that outputs a high voltage having a predetermined polarity, and including second and third high voltage output units that output a high voltage having a polarity opposite to the predetermined polarity. Rectification units that are connected to the first high voltage output unit separate a current path to the second high voltage output unit from a current path to the third high voltage output unit.

13 Claims, 8 Drawing Sheets

FIG. 1

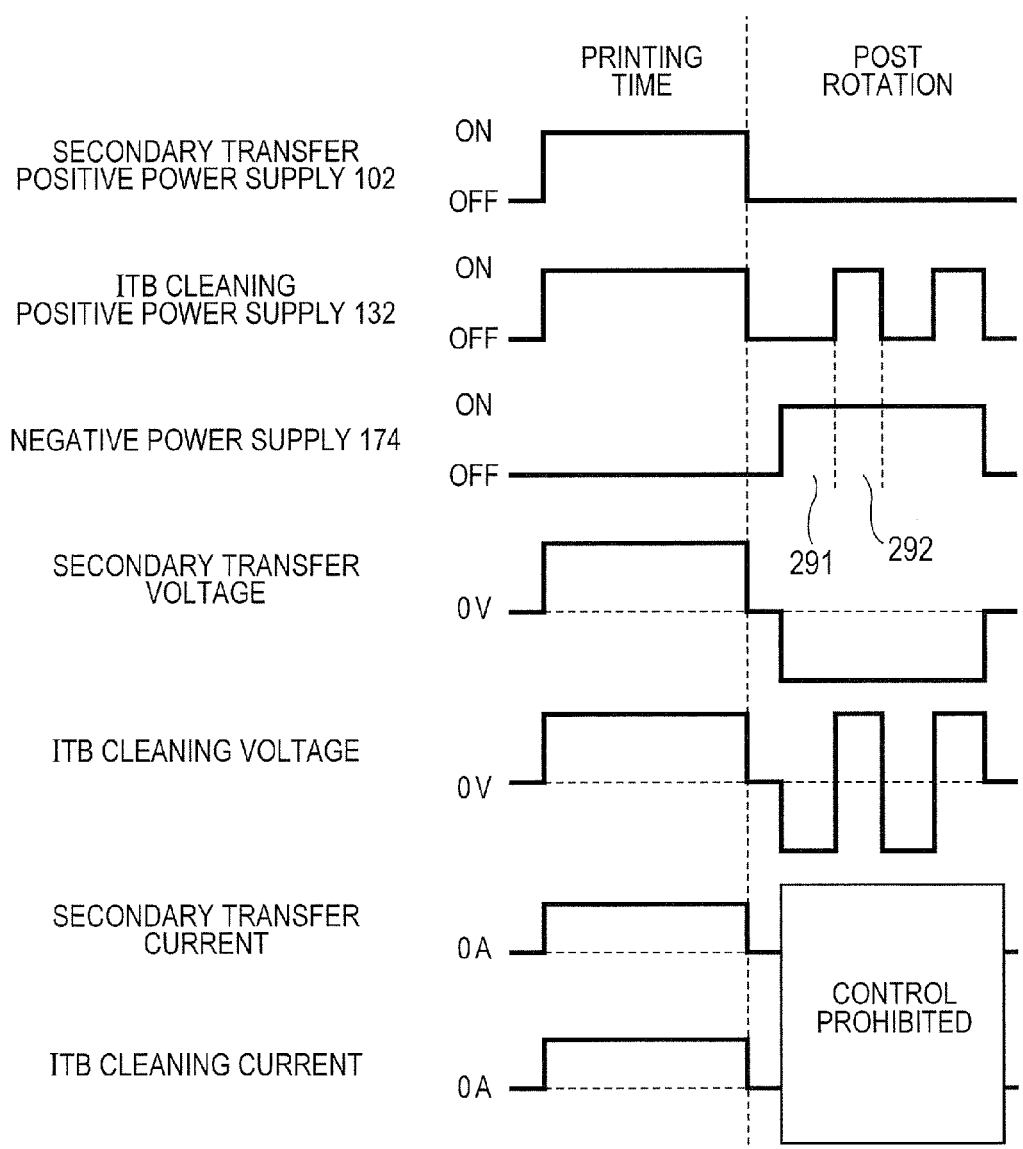

FIG. 5

| ITEM | CONVENTIONAL EXAMPLE | PRESENT EMBODIMENT | CHARACTERISTICS OF THE PRESENT INVENTION COMPARED TO CONVENTIONAL EXAMPLE |
|---|---|---|---|
| COST | I | S | REDUCTION OF COST AND D/A PORT BY THE COMBINATION OF A MULTISTAGE VOLTAGE DOUBLER RECTIFICATION CIRCUIT AND A DRIVING CIRCUIT |
| SUBSTRATE AREA | I | S | REDUCTION OF SUBSTRATE AREA BY THE COMBINATION OF A MULTISTAGE VOLTAGE DOUBLER RECTIFICATION CIRCUIT AND A DRIVING CIRCUIT |
| POWER SUPPLY POTENTIAL | S | I | MAXIMUM VOLTAGE OF POSITIVE POWER SUPPLY DECREASES AND ENHANCE THE POWER OF THE TRANSFORMER |
| PERFORMANCE OF CURRENT DETECTION | S | S | IT IS IMPOSSIBLE TO DETECT CURRENT IN THE CASE WHERE THE POLARITY OF THE SECONDARY TRANSFER VOLTAGE IS DIFFERENT FROM THAT OF ITB CLEANING VOLTAGE. THERE IS NO PROBLEM IN THE CLEANING SEQUENCE. THE ACCURACY OF THE CURRENT DETECTION IS THE SAME AS THAT OF THE CONVENTIONAL TYPES. |
| POSITIVE AND NEGATIVE VOLTAGE OUTPUT | S | S | IT IS IMPOSSIBLE TO SET AND CONTROL THE POLARITY OF THE SECONDARY TRANSFER NEGATIVE VOLTAGE AND THE ITB CLEANING NEGATIVE VOLTAGE INDIVIDUALLY. THERE IS NO PROBLEM IN THE CLEANING SEQUENCE. THE ACCURACY OF THE CURRENT DETECTION IS THE SAME AS THAT OF THE CONVENTIONAL TYPE. |

S : SUPERIOR OR EQUIVALENT TO THE OTHER
I : INFERIOR TO THE OTHER

HIGH VOLTAGE POWER SUPPLY AND IMAGE FORMING APPARATUS

BACKGROUND OF THE INVENTION

1. Field of the Invention

The present invention relates to a high voltage power supply used for an image forming apparatus using an electrophotographic system, and the image forming apparatus.

2. Description of the Related Art

An image forming apparatus adopting an electrophotographic system includes various high voltage power supplies, which are necessary for an image forming process for forming an image on a recording medium. This high voltage power supply may be, for instance, a high voltage power supply for a charge apparatus, a high voltage power supply for a developing apparatus and a high voltage power supply for a transfer apparatus, which are various modularized power supplies. These modularized power supplies have specifications different according to the configurations of image forming apparatuses. For instance, there are specifications that superpose the output of an ac high voltage power supply on the output of a dc high voltage power supply, and specifications that superpose the output of a dc positive high voltage power supply on the output of a dc negative high voltage power supply. Furthermore, there are various specifications on specified voltage, specified current and constant current control systems, constant voltage control systems, single value output and multistage value control output, and load conditions.

For instance, as to a transfer voltage, to remove toner attached to a transfer roller during a cleaning operation of an image forming apparatus, it is required to apply, on the transfer roller, a voltage having a polarity opposite to the polarity of a voltage applied during normal transfer. In general, toner itself has a negative polarity. Accordingly, during a transfer process of forming an image, the toner is transferred from a photosensitive drum to an intermediate transfer belt and from the intermediate transfer belt to a recording medium by applying a voltage from a high voltage power supply having a positive polarity (hereinafter, referred to as "positive power supply"). In contrast, during a cleaning process, toner is discharged from a transfer member to the intermediate transfer belt, and toner that is on the intermediate transfer belt and to be removed is transferred via the photosensitive drum into a used toner container. For instance, Japanese Patent Application Laid-Open No. 2008-309904 proposes an image forming apparatus that inversely transfers toner that has not been transferred on a recording medium and remains on an intermediate transfer belt onto a photosensitive drum and collects the toner.

FIG. 8 schematically illustrates a conventional secondary transfer power supply and ITB cleaning power supply in an image forming apparatus including an intermediate transfer belt (hereinafter, abbreviated as "ITB") 900. In FIG. 8, an MPU 901 is a microprocessor that detects load currents flowing through a secondary transfer roller 906 and an ITB cleaning brush 916 and controls outputs of the secondary transfer power supply and the ITB cleaning power supply based on the detected load current value. A secondary transfer positive power supply 902 and a secondary transfer negative power supply 903 apply positive and negative voltages, respectively, on the transfer roller 906 according to control signals (analog signals) from the MPU 901 via a D/A port. An ITB cleaning positive power supply 912 and an ITB cleaning negative power supply 913 apply positive and negative voltages, respectively, on the ITB cleaning brush 916 according to control signals (analog signals) from the MPU 901 via a D/A port. Resistors 904, 905, 914 and 915 are bleeder resistors.

In image forming, a toner image on a photosensitive drum 908 is transferred onto the ITB 900 by a transfer voltage applied from a primary transfer power supply (not illustrated) to a primary transfer pad 909. Subsequently, according to a control by the MPU 901, a transfer voltage having a positive polarity is applied from the secondary transfer positive power supply 902 to the secondary transfer roller 906, and the toner image on the ITB 900 is transferred onto the recording medium 920. The toner that has not been transferred onto the recording medium 920 and remains on the ITB 900 is temporarily collected to an ITB cleaning brush 916 by the MPU 901 causing the ITB cleaning positive power supply 912 to apply a voltage having the positive polarity to the ITB cleaning brush 916. At this time, a secondary transfer current having flown to the secondary transfer roller 906 flows to the ground (hereinafter, referred to as "GND") of the photosensitive drum 908, and passes, from the GND of a load current detection circuit 907, through this load current detection circuit 907 and bleeder resistor 905, and returns to the secondary transfer positive power supply 902. Accordingly, the value of the secondary transfer current can be detected by the load current detection circuit 907. The detected load current value is input into the MPU 901 via an A/D port according to an analog signal output from the load current detection circuit 907. Likewise, the ITB cleaning current flows from the ITB cleaning brush 916 to the GND of the photosensitive drum 908, passes from the GND of the load current detection circuit 917 through this load current detection circuit 917 and the bleeder resistor 915, and returns to the ITB cleaning positive power supply 912. Accordingly, the value of the ITB cleaning current can be detected by the load current detection circuit 917. The detected load current value is input into the MPU 901 via an A/D port according to an analog signal output from the load current detection circuit 917.

Meanwhile, in the cleaning process, the MPU 901 turns on the secondary transfer negative power supply 903 and the ITB cleaning negative power supply 913. The negative voltages supplied from the respective negative power supplies are applied to the secondary transfer roller 906 and the ITB cleaning brush 916 via the bleeder resistors 904 and 914. The toner adhering to the secondary transfer roller 906 is transferred to the ITB 900 by the negative voltage applied to the secondary transfer roller 906, and removed from this secondary transfer roller 906. The toner temporarily collected and accumulated at the ITB cleaning brush 916 is discharged onto the ITB 900 by the negative voltage applied to the ITB cleaning brush 916. The discharged toner is inversely transferred to the photosensitive drum 908 and collected into a cleaner container in this photosensitive drum.

According to the power supply configuration superposing the positive power supply on the negative power supply as illustrated in FIG. 8, a negative voltage is output via the bleeder resistor, thereby reducing the accuracies of the output voltage and output current. However, in general, a negative voltage applied for removing toner does not require strict voltage and current accuracies in comparison with a positive voltage applied for forming an image. Accordingly, only application of a voltage having at least a predetermined value can satisfy a required cleaning performance.

In recent years, further reduction in size and cost of an image forming apparatus has been required. As described above, the high voltage power supply included in the conventional image forming apparatus is provided with independent power supply circuits for respective voltages to be applied. This configuration causes a problem of increase in cost due to increase in the number of components and a problem of increase in area of a circuit substrate. Accordingly, also the high voltage power supply is required to be reduced in size and cost.

SUMMARY OF THE INVENTION

A purpose of the invention is to allow the number of power supplies to be reduced owing to sharing of the high voltage power supply while maintaining the functions of supplying high voltages in the image forming apparatus.

Another purpose of the invention is to provide a high voltage power supply includes a first high voltage output unit that outputs a high voltage having a predetermined polarity, a plurality of rectification units connected to the output of the first high voltage output unit; a second high voltage output unit that is connected to one of the plurality of rectification units and outputs a high voltage having a polarity opposite to the predetermined polarity; and a third high voltage output unit that is connected to another one of the plurality of rectification units and outputs a high voltage having a polarity opposite to the predetermined polarity, wherein the plurality of rectification units separate a current path to the second high voltage output unit and a current path to the third high voltage output unit from each other.

Another purpose of the invention is to provide an image forming apparatus includes an image forming unit for forming an image; and a high voltage power supply that supplies the image forming unit with a high voltage, wherein the high voltage power supply includes, a first high voltage output unit outputting a high voltage having a predetermined polarity, a plurality of rectification units connected to the output of the first high voltage output unit; a second high voltage output unit that is connected to one of the plurality of rectification units and outputs a high voltage having a polarity opposite to the predetermined polarity; and a third high voltage output unit that is connected to another one of the plurality of rectification units and outputs a high voltage having a polarity opposite to the predetermined polarity, and the plurality of rectification units separate a current path to the second high voltage output unit and a current path to the third high voltage output unit from each other.

A still further purpose of the present invention will become apparent from the following description of exemplary embodiments with reference to the attached drawings.

BRIEF DESCRIPTION OF THE DRAWINGS

FIG. 1 is a diagram illustrating configurations of a secondary transfer power supply and an ITB cleaning power supply of Embodiment 1.

FIG. 4 is a sequence diagram of the secondary transfer power supply and the ITB cleaning power supply of Embodiment 1.

FIG. 5 is a diagram illustrating comparison in power supply configuration between Embodiment 1 and the conventional example.

DESCRIPTION OF THE EMBODIMENTS

Preferred embodiments of the present invention will now be described in detail in accordance with the accompanying drawings.

A configuration and an operation of the present invention will now be described. Embodiments described below are examples. There is no intention to limit the technical scope of the present invention only thereto. Hereinafter, referring to accompanying drawings, modes for implementing the present invention will be described in detail according to embodiments.

Embodiment 1 will now be described.

Overview of Secondary Transfer Power Supply and ITB Cleaning Power Supply

Figure 1:
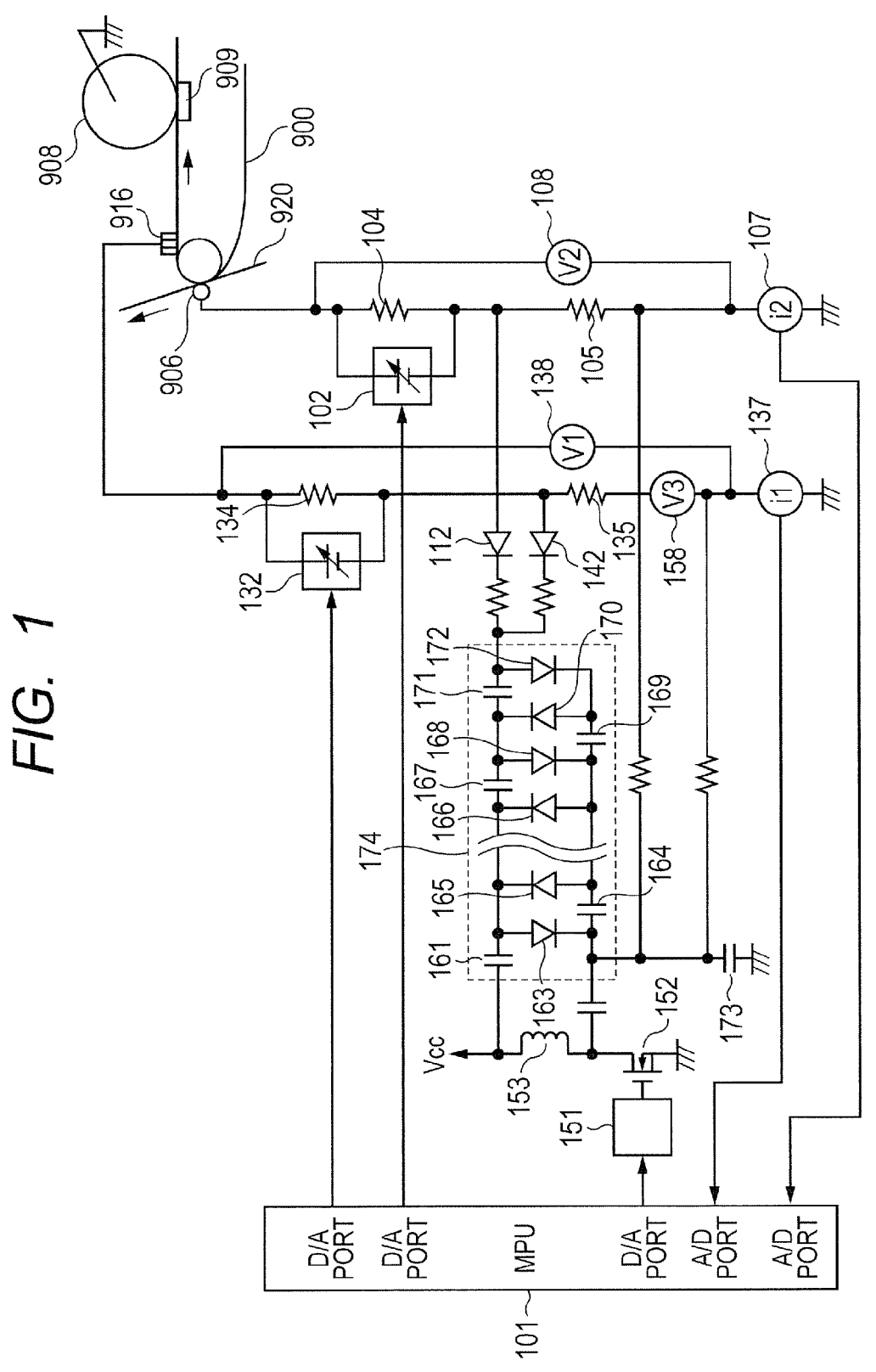
Figure 8:
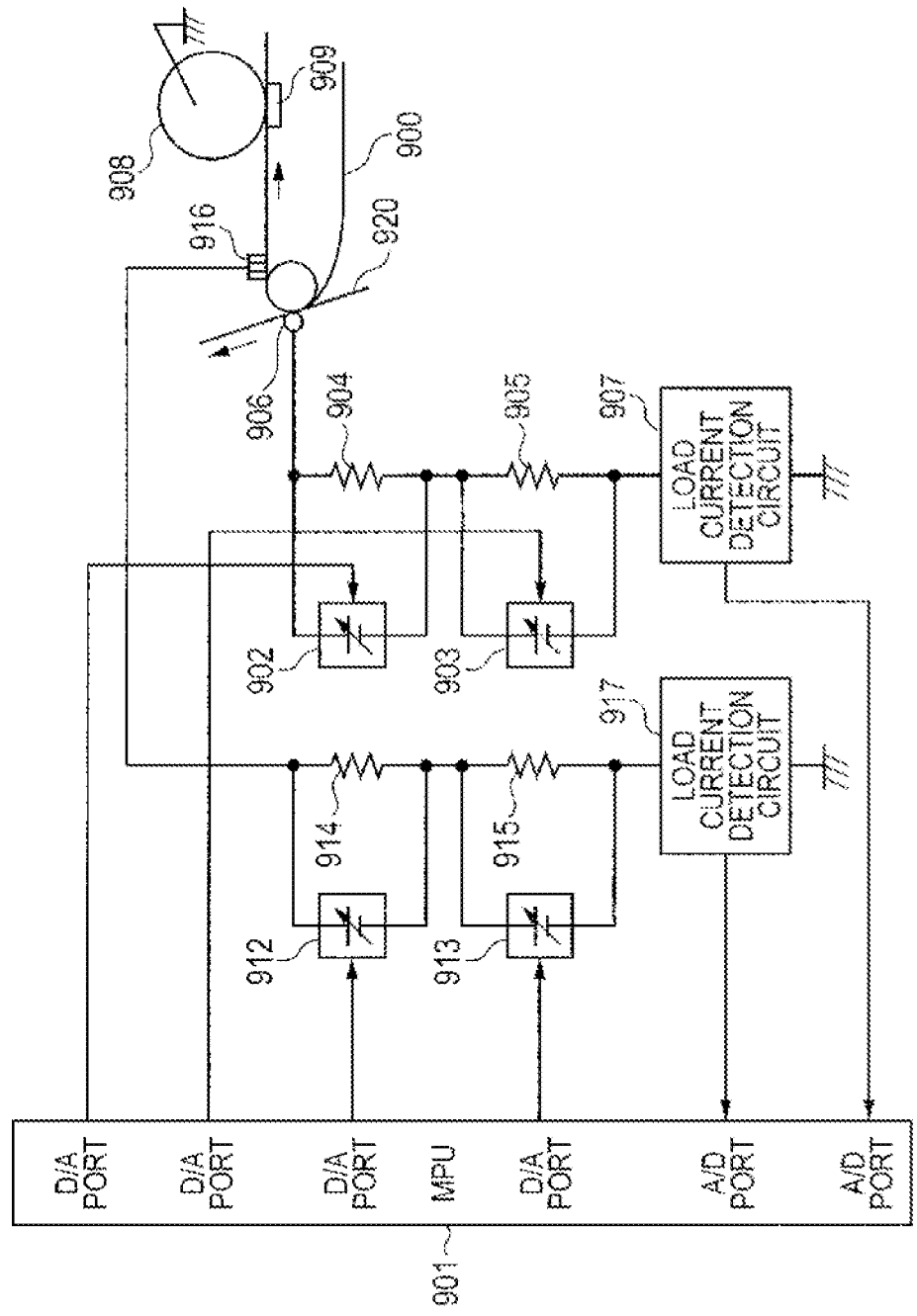
FIG. 8 is a diagram illustrating configurations of a secondary transfer power supply and an ITB cleaning power supply of a conventional example.

FIG. 1 is a schematic diagram illustrating configurations of a secondary transfer power supply and an ITB cleaning power supply of an image forming apparatus of the present embodiment. In FIG. 1, identical symbols are assigned to configurational components identical to those in FIG. 8 in the conventional example. The description thereof is omitted. Major differences between FIG. 1 in the present embodiment and FIG. 8 in the conventional example are in that the outputs of a secondary transfer positive power supply and an ITB cleaning positive power supply are superposed on the output of a single negative power supply, and the negative power supply is separated by use of diodes 112 and 142 such that each positive power supply does not affect the negative power supply.

In FIG. 1, an MPU 101 is a microprocessor that detects load currents flowing through a secondary transfer roller 906 and an ITB cleaning brush 916 and controls the secondary transfer power supply and the ITB cleaning power supply. The negative power supply, as a first high voltage power supply, includes, a voltage resonance circuit, and a multistage voltage doubler rectification circuit 174, which is a voltage generation unit. The voltage resonance circuit includes a clock oscillator 151, a Field-Effect Transistor (FET) 152, an inductor 153 and a capacitor 173. The clock oscillator 151 controls and adjusts one of a frequency and a duty ratio according to a control signal (analog signal) from the MPU 101 via a D/A port. The multistage voltage doubler rectification circuit 174 doubles and rectifies the voltage generated by the voltage resonance circuit to achieve a high voltage, and includes capacitors 161, 164, 167, 169 and 171 and diodes 163, 165, 166, 168, 170 and 172. A secondary transfer positive power supply 102 and an ITB cleaning positive power supply 132, which are voltage output units of second high voltage power supplies, include: a transformer driving circuit that drives a transformer according to a control signal from the MPU 101; the transformer that generates an output voltage; and a rectification circuit that rectifies the voltage output from the transformer.

Voltage detection circuits 108 and 138 resistance-divide a positive voltage to the secondary transfer roller 906 and a positive voltage to the ITB cleaning brush 916, and feed the voltages back (not illustrated) to the secondary transfer positive power supply 102 and the ITB cleaning positive power supply 132, respectively, to perform constant voltage control. A voltage detection circuit 158 resistance-divides an anode voltage of the diode 142 and feeds the voltage back (not illustrated) to a clock oscillator 151 to perform constant voltage control on a negative power supply. The anode voltage of the diode 112 becomes a negative voltage to the secondary transfer roller 906 via the bleeder resistor 104. The anode voltage of the diode 142 becomes a negative voltage to the ITB cleaning brush 916 via the bleeder resistor 134. The current detection circuits 107 and 137 detect load currents flowing into the secondary transfer roller 906 and the ITB cleaning brush 916, respectively. The detected values of the load currents are output as analog signals to A/D ports of the MPU 101.

Current Paths of Secondary Transfer Power Supply and ITB Cleaning Power Supply

Figure 2:
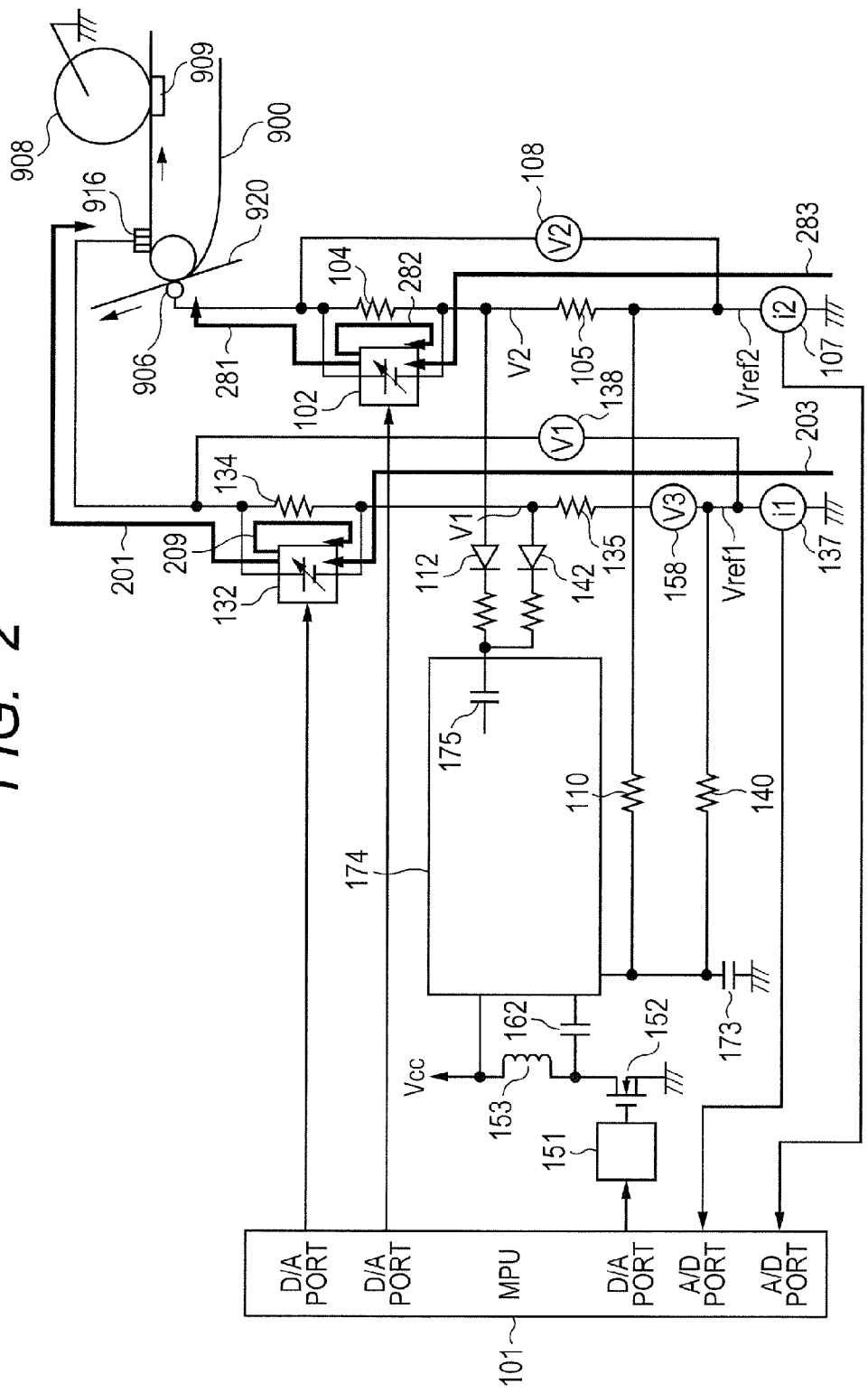
FIG. 2 is a diagram illustrating the configurations of the secondary transfer power supply and the ITB cleaning power supply of Embodiment 1.

FIG. 2 is a diagram illustrating current paths from the secondary transfer power supply and the ITB cleaning power supply in the circuit in FIG. 1. In FIG. 2, the current path from the secondary transfer power supply indicates the path of a current (hereinafter, referred to as a secondary transfer positive current) flowing when a positive voltage is applied to the secondary transfer roller 906 to secondarily transfer toner residing on the intermediate transfer belt 900 onto a recording medium 920. The current path from the ITB cleaning power supply indicates the path of a current (hereinafter, referred to as an ITB cleaning positive current) flowing when a positive voltage is applied to the ITB cleaning brush 916 to absorb toner that has not been transferred onto the recording medium and remains on the ITB 900. At this time, the secondary transfer positive power supply 102 and the ITB cleaning positive power supply 132 are in an on state, and the negative power supply including the multistage voltage doubler rectification circuit 132 is in an off state. In FIG. 2, the multistage voltage doubler rectification circuit 174 is not directly related to the current path. Accordingly, for simplicity, the internal circuits of the multistage voltage doubler rectification circuit are equivalently represented only with a capacitor 175.

The current path of the ITB cleaning positive current, which flows when a positive voltage is applied from the ITB cleaning positive power supply 132 to the ITB cleaning brush 916, includes paths 201 and 203. Along the path 201, the positive current from the ITB cleaning positive power supply 132 flows through the ITB cleaning brush 916, the ITB 900, which is the intermediate transfer belt, and the photosensitive drum 908, to the GND of this photosensitive drum 908. Along the path 203, the positive current from the ITB cleaning positive power supply 132 returns from the GND of the current detection circuit 137 to the ITB cleaning positive power supply 132 via the current detection circuit 137 and the bleeder resistor 135.

Meanwhile, the current path of the secondary transfer positive current, which flows when a positive voltage is applied from the secondary transfer positive power supply 102 to the secondary transfer roller 906, includes paths 281 and 283. Along the path 281, the positive current from the secondary transfer positive power supply 102 flows through the secondary transfer roller 906, the recording medium 920, the ITB 900, which is the intermediate transfer belt, and the photosensitive drum 908, to the GND of this photosensitive drum 908. Along the path 283, the positive current from the secondary transfer positive power supply 102 passes from the GND of the current detection circuit 107 through this current detection circuit 107 and the bleeder resistor 105 and returns to the secondary transfer positive power supply 102.

In the case of the ITB cleaning positive current, there is a path 209 of a current that does not flow through process components. Along this path, the current passes from the ITB cleaning positive power supply 132 through the bleeder resistor 134 and returns to the ITB cleaning positive power supply 132. Meanwhile, in the case of the secondary transfer positive current, there is a path 282 of a current, along which the current flows from the secondary transfer positive power supply 102 through the bleeder resistor 104 and returns to the secondary transfer positive power supply 102.

Voltages Vref1 and Vref2 on the ungrounded sides of the current detection circuits 137 and 107 are controlled typically by operational amplifiers (not illustrated) so as to be constant voltages. The voltage resonance circuit including the clock oscillator 151, the FET 152, the inductor 153 and the capacitor 173 is separated from the voltages Vref2 and Vref1 by the resistors 110 and 140, respectively, so as not to affect the voltages Vref1 and Vref2. Accordingly, the voltages Vref1 and Vref2 can be set to different voltages to allow the current detection accuracies to be adjusted.

Provided that the value of the ITB cleaning positive current flowing through the path 203 is i1, the anode voltage Va of the diode 142 is represented as follows, using the resistor value R1 of the bleeder resistor 135.

$$Va = Vref1 - i1 \times R1.$$

Meanwhile, provided that the value of the secondary transfer positive current flowing through the path 283 is i2, the anode voltage Vb of the diode 112 is represented as follows, using the resistor value R2 of the bleeder resistor 105.

$$Vb = Vref2 - i2 \times R2.$$

In order to correctly detect currents even in the case where the voltages Va and Vb are different from each other, the diodes 112 and 142 separate the voltages Va and Vb. Accordingly, the current paths for the secondary transfer positive power supply 102 and the ITB cleaning positive power supply 132 are secured.

Figure 3:
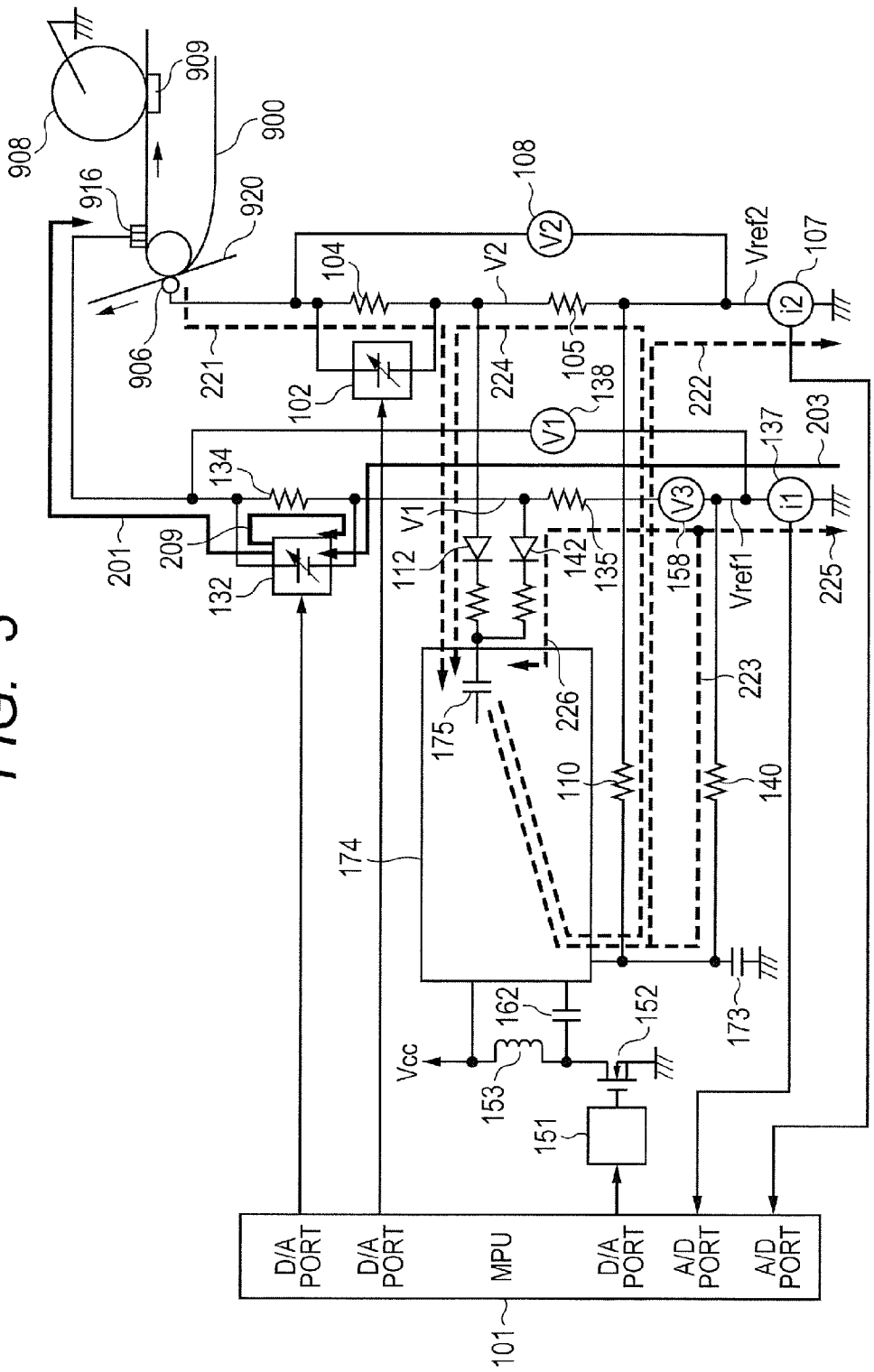
FIG. 3 is a diagram illustrating the configurations of the secondary transfer power supply and the ITB cleaning power supply of Embodiment 1.

FIG. 3 is a diagram illustrating the current paths from the secondary transfer power supply and the ITB cleaning power supply, as with FIG. 2. As to the current path from the secondary transfer power supply, a path of a current (hereinafter, referred to as a secondary transfer negative current) flowing when a negative voltage is applied to the secondary transfer roller 906 to remove toner adhering to this secondary transfer roller 906 is illustrated with broken lines. The ITB cleaning positive current passes through a current path analogous to the path in FIG. 2. This path includes paths 201 and 203. At this time, the negative power supply including the ITB cleaning positive power supply 132 and the multistage voltage doubler rectification circuit 174 is in the on state, and the secondary transfer positive power supply 102 is in the off state.

The current path of the secondary transfer negative current that flows when the negative voltage from the capacitor 175 of the multistage voltage doubler rectification circuit, which is the secondary transfer negative power supply, is applied to the secondary transfer roller 906 includes paths 221 and 222. Along the path 222, the negative current from the capacitor 175 of the multistage voltage doubler rectification circuit flows through the resistor 110 and the current detection circuit 107 to the GND of this current detection circuit 107. Along the path 221, the negative current from the capacitor 175 passes from the GND of the photosensitive drum 908 through this photosensitive drum 908, the ITB 900 and the secondary transfer roller 906 and returns via the bleeder resistor 104 and the diode 112 to the capacitor 175.

As to a path of the current along which the current does not flow through the process components, the secondary transfer negative current flows along a path 224, from a path 223 to a path 226 and from the path 223 to a path 225. Along the path 224, the current flows through the resistor 110, the bleeder resistor 105 and the diode 112. From the path 223 to the path 226, the current flows through the resistor 140, the bleeder resistor 135 and the diode 142. From the path 223 to the path 225, the current flows through the resistor 140 and the current detection circuit 137. Here, both the negative current flowing through the path 225 and the ITB cleaning positive current 203 tend to flow through the current detection circuit 137. Accordingly, the MPU 101 cannot correctly detect the ITB cleaning positive current 203. However, also in this case, the voltage Vref1 on the ungrounded side of the current detection circuit 137 is controlled to be a constant voltage as a reference voltage typically by an operational amplifier (not illustrated). Accordingly, the constant voltage can be output to the ITB cleaning brush 916. Thus, in the case where the secondary transfer power supply and the ITB cleaning power supply output the voltages having different polarities, the configuration is applicable only in the case without the need for current detection. This case is, for instance, cases for various cleaning uses in which the function of the image forming apparatus can be exerted without current detection when at least a certain voltage is output.

Current Detection for Secondary Transfer Power Supply and ITB Cleaning Power Supply In the case, as with FIG. 3, where the secondary transfer positive power supply 102 is in the off state and the output is from the ITB cleaning positive power supply 132 and the secondary transfer negative power supply including the multistage voltage doubler rectification circuit 174, the voltage Va is subjected to constant voltage control by the voltage detection circuit 158. Accordingly, when the control voltage value by the voltage detection circuit 158 is higher than the value calculated according to the expression (Vref1−i1×R1), the voltage Va becomes the control voltage value. In contrast, when the control voltage value is lower than the value calculated according to the expression (Vref1−i1×R1), the voltage Va is subjected to the constant voltage control so as to be the voltage value calculated according to the expression (Vref1−i1×R1). In this case, the potential difference between the opposite ends of the ITB cleaning positive power supply 132 increases in comparison with a potential difference when the ITB cleaning positive power supply is in the off state and the voltage Va is not subjected to the voltage control. Accordingly, the load on the ITB cleaning positive power supply also increases. Thus, measures thereagainst may be necessary. As the measures, the output of a transformer provided in the ITB cleaning positive power supply 132 is increased. As other measure, in the cleaning sequence as with the case in FIG. 3 where the positive and negative voltages are applied, the voltages are restricted.

Furthermore, in the case where both the secondary transfer voltage and the ITB cleaning voltage have the negative polarity, the negative power supply including the multistage voltage doubler rectification circuit 174 is in the on state and the secondary transfer positive power supply 102 and the ITB cleaning positive power supply 132 are in the off state. The secondary transfer negative current flows from the capacitor 175 of the multistage voltage doubler rectification circuit through the resistor 110 and the current detection circuit 107 to the GND of this current detection circuit 107. The secondary transfer negative current then flows from the GND of the photosensitive drum 908 through this photosensitive drum 908, the ITB 900 and the secondary transfer roller 906 and returns via the bleeder resistor 104 and the diode 112 to the capacitor 175. Meanwhile, the ITB cleaning negative current flows from the capacitor 175 of the multistage voltage doubler rectification circuit through the resistor 140 and the current detection circuit 137 to the GND of this current detection circuit 137. The ITB cleaning negative current then flows from the GND of the photosensitive drum 908 through this photosensitive drum 908, the ITB 900 and the ITB cleaning brush 916 and returns via the bleeder resistor 134 and the diode 142 to the capacitor 175. In this case, the circuit configuration includes only one negative power supply. Accordingly, this configuration has a limitation in that the secondary transfer negative voltage and the ITB cleaning negative voltage cannot be set to voltages different from each other. However, as described above, typical application of a negative voltage for removing toner does not require a strict accuracy of the voltage to be applied (accuracy of a current to flow) in comparison with application of the positive voltage for image forming. Accordingly, only if a voltage having at least a predetermined value is applied, the cleaning performance can be satisfied.

FIG. 4 illustrates an example of sequences of the secondary transfer voltage, the secondary transfer current, the ITB cleaning voltage and the ITB cleaning current during printing and post rotation after printing. During printing, the secondary transfer positive power supply 102 and the ITB cleaning positive power supply 132 are turned on and constant current control is performed. After printing, the secondary transfer positive power supply 102 and the ITB cleaning positive power supply 132 are turned off, and the negative power supply 174 is turned on. Thus, toner on the secondary transfer roller 906 and toner on the ITB cleaning brush 916 are removed. In actuality, the toner on the ITB cleaning brush 916 is removed by outputting the ITB cleaning voltage alternately positively and negatively, as illustrated in reference numerals 291 and 292 in FIG. 4. In the case 291 in FIG. 4, both the secondary transfer voltage and the ITB cleaning voltage are negative voltages. In the case 292, the secondary transfer voltage is a negative voltage and the ITB cleaning voltage is a positive voltage. This is because of the characteristics of the ITB cleaning brush 916. According to the characteristics, toner can be discharged more efficiently by outputting the ITB cleaning voltage alternately positively and negatively to cause a slope (dV/dt) of the voltage than by a dc negative voltage. The detailed description is omitted.

Although not illustrated in the sequence in FIG. 4, the case with the polarities of voltages opposite to the polarities in FIG. 3 is considered. That is, in the case where the secondary transfer voltage has the positive polarity and the ITB cleaning voltage has the negative polarity, the secondary transfer positive power supply 102 is in the on state, the ITB cleaning positive power supply 132 is in the off state and the secondary transfer negative power supply including the multistage voltage doubler rectification circuit 174 is in the on state. The secondary transfer positive current flows from the secondary transfer positive power supply 102 through the secondary transfer roller 906, the ITB 900 and the photosensitive drum 908 to the GND of this photosensitive drum 908. The secondary transfer positive current passes from the GND of the current detection circuit 107 through this current detection circuit 107 and the bleeder resistor 105 and returns to the secondary transfer positive power supply 102. Meanwhile, the ITB cleaning negative current flows from the capacitor 175 of the multistage voltage doubler rectification circuit through the resistor 140 and the current detection circuit 137 to the GND of this current detection circuit 137. The ITB cleaning negative current then flows from the GND of the photosensitive drum 908 through this photosensitive drum 908, the ITB 900 and the ITB cleaning brush 916 and returns via the bleeder resistor 134 and the diode 142 to the capacitor 175. In this case, the potential difference between the opposite ends of the secondary transfer positive power supply 102 increases in comparison with the case where the secondary transfer positive power supply is in the off state. Accordingly, the load on the secondary transfer positive power supply 102 also increases. As with FIG. 3, measures thereagainst may be necessary. According to the measures, the output of the transformer provided in the secondary transfer positive power supply 102 may be increased. According to another measures, the voltage in the cleaning sequence may be restricted. In this case, the MPU 101 cannot cause the current detection circuit 107 to correctly detect the secondary transfer positive current. This is because the ITB cleaning negative current tends to flow through the current detection circuit 107. Accordingly, in the case where the secondary transfer voltage has the positive polarity and the ITB cleaning voltage has the negative polarity, the configuration is applicable only to the case with no need to detect the secondary transfer current.

FIG. 5 illustrates comparison between power supply configurations of the conventional example and the present embodiment. More specifically, the configurations are compared with each other in view of the substrate area, the power supply potential, the performance of current detection, and the positive and negative voltage output. The result of the comparison is illustrated with two types of symbols, which are S (superior or equivalent to the other) and I (inferior to the other). As to the cost and the substrate area, in the conventional power supply, both the secondary transfer power supply and the ITB cleaning power supply include the positive and negative power supplies. Meanwhile, according to the present embodiment, the multistage voltage doubler rectification circuit, which is shared by the secondary transfer power supply and the ITB cleaning power supply, and the voltage resonance circuit, which is the driving circuit of the multistage voltage doubler rectification circuit, are adopted as the negative power supplies. This configuration allows the cost and the substrate area to be reduced. Furthermore, one D/A port for the negative power supply can be reduced. Accordingly, the cost is reduced. However, as to the power supply potential, the maximum voltage of the positive power supply is reduced. Accordingly, to achieve the conventional maximum voltage in the present embodiment, the output of the transformer for the positive power supply is required to be increased. In the present embodiment, the output of the transformer can be increased by increasing the number of steps of the voltage doubler rectification circuit. Accordingly, the adverse effects of increase in cost and substrate area are small. As to the performance of current detection, the current detection accuracy is analogous to the conventional accuracy as described above. In the case where the polarities of the secondary transfer voltage and the ITB cleaning voltage are different from each other, the current cannot be detected. However, this configuration causes no problem in the cleaning sequence. Furthermore, the negative power supply is shared by the secondary transfer power supply and the ITB cleaning power supply. Accordingly, the voltages cannot separately be set for the respective power supplies. However, this configuration causes no problem in the cleaning sequence.

As described above, the present embodiment can reduce the number of power supplies by sharing the high voltage power supply, while maintaining the function of the image forming apparatus that supplies a high voltage. According to the present embodiment, the two power supplies, which are the secondary transfer positive power supply and the ITB cleaning positive power supply, are superposed on the single negative power supply; the current paths are separated such that each positive power supply does not affect the negative power supply. This configuration can reduce the negative power supplies by use of the multistage voltage doubler rectification circuit and the driving circuit thereof, and reduce the signal ports for controlling the negative power supplies. Accordingly, this configuration can further reduce the cost of the circuits and the size of the substrate. In the present embodiment, the negative power supply is configured by the multistage voltage doubler rectification circuit including the diodes and capacitors. However, even in the case of a configuration with any of a wound transformer and a piezoelectric transformer, advantageous effects analogous to the effects of the present embodiment can be achieved. In this case, there is a possibility that the size of any of the wound transformer and the piezoelectric transformer increases. Even in this case, the advantageous effects of reduction in cost by reducing the number of the power supplies and of reduction in substrate size are exerted. In present embodiment, the voltage detection circuits 108 and 138 are fed back to the positive power supplies 102 and 132, respectively, and the voltage detection circuit 158 is fed back to the clock oscillator 151, thereby performing constant voltage control. Instead, the signal of the voltage detection circuit may be fed back to the MPU 101, thereby performing constant voltage control.

Embodiment 2 will now be described.

Overview of Secondary Transfer Power Supply and ITB Cleaning Power Supply

Figure 6:
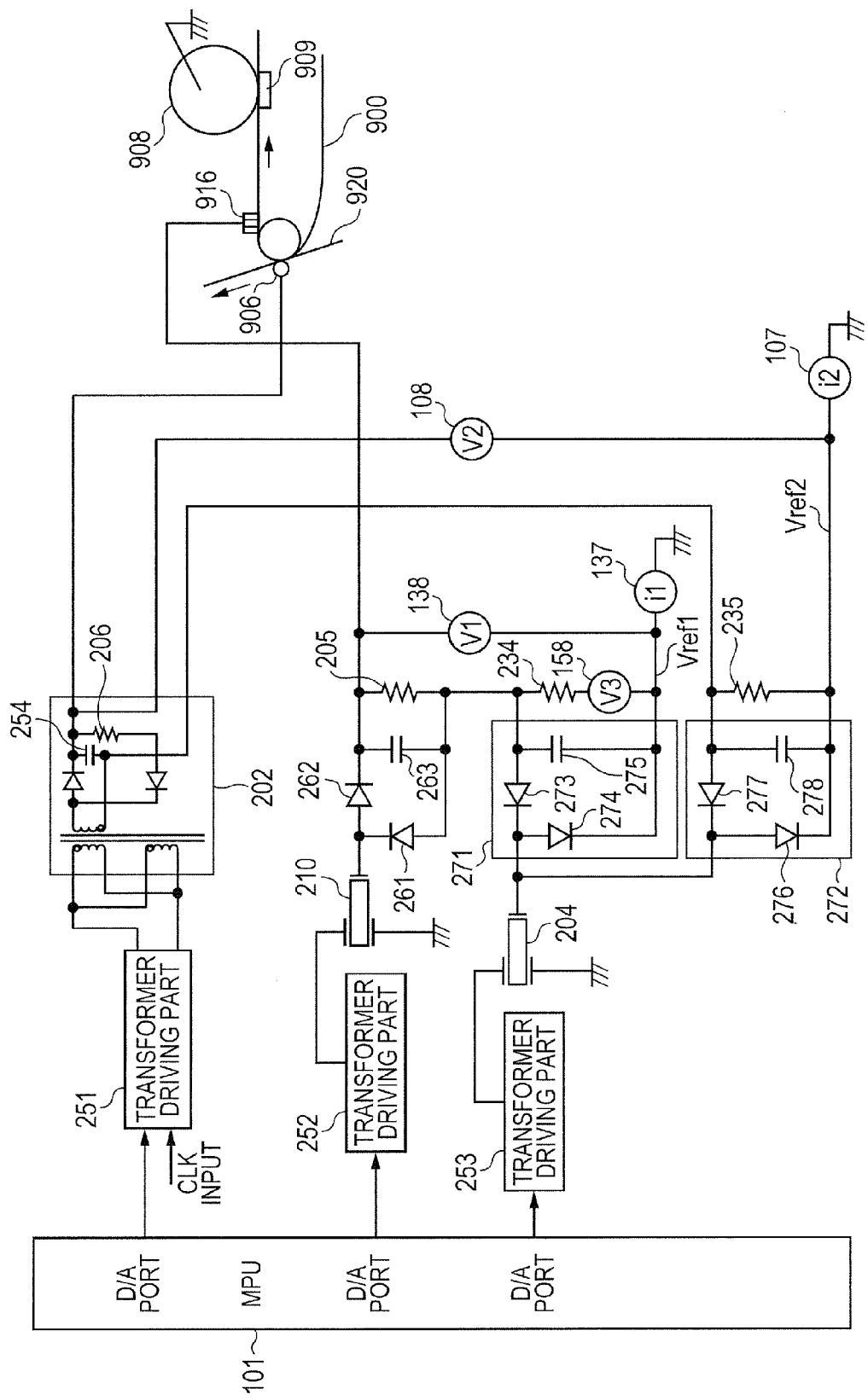
FIG. 6 is a diagram illustrating configurations of a secondary transfer power supply and an ITB cleaning power supply of Embodiment 2.

FIG. 6 is a schematic diagram illustrating configurations of a secondary transfer power supply and an ITB cleaning power supply of an image forming apparatus of the present embodiment. In FIG. 6, identical symbols are assigned to configurational components identical to those in FIG. 1 in Embodiment 1. The description thereof is omitted. FIG. 6 in the present embodiment is different from FIG. 1 in Embodiment 1 in that rectification circuits 271 and 272 intervene in the output of a piezoelectric transformer 204 for a negative power supply to separate a current path to the secondary transfer roller and a current path to the ITB cleaning brush from each other. This configuration also separates the reference voltages Vref1 and Vref2 on the ungrounded sides of the respective current detection circuits 137 and 107 from each other. As with Embodiment 1, the present embodiment has the same concept that separates the current paths for the secondary transfer power supply and the ITB cleaning power supply from each other.

In FIG. 6, a transformer driving unit 251 of a secondary transfer positive power supply drives a flyback transformer 202. This driving unit is driven at a certain frequency according to an analog signal (e.g. PWM signal) input from a D/A port of the MPU 101. The control signal for controlling a voltage (PWM signal) and a clock signal for designating a frequency are input into the transformer driving unit 251. The flyback transformer 202 internally includes a capacitor 254 and a bleeder resistor 206. This transformer comes into the on state according to control by the transformer driving unit 251, and applies a positive voltage to the secondary transfer roller 906.

The transformer driving units 252 and 253 drive piezoelectric transformers 210 and 204, respectively. These driving units drive the respective piezoelectric transformers at frequencies based on control signals (frequency setting signals) input from D/A ports of the MPU 101 to output predetermined voltages. The piezoelectric transformer 210 comes into the on state according to control by the transformer driving unit 252, and applies a positive voltage to the ITB cleaning brush 916. Diodes 261 and 262 and a capacitor 263 configure a rectification circuit for rectifying the output of the piezoelectric transformer 210. A resistor 205 is a bleeder resistor.

The piezoelectric transformer 204 comes into the on state according to control by the transformer driving unit 253, and applies a negative voltage to the ITB cleaning brush 916 via the rectification circuit 271 and applies a negative voltage to the secondary transfer roller 906 via the rectification circuit 272. The rectification circuit 271 includes diodes 273 and 274 and a capacitor 275. The rectification circuit 272 includes diodes 276 and 277 and a capacitor 278. These circuits rectify the output from the piezoelectric transformer 204. Resistors 234 and 235 are bleeder resistors.

Current Paths and Current Detection of Secondary Transfer Power Supply and ITB Cleaning Power Supply A charge pump of the capacitor 254 in the flyback transformer 202 causes the secondary transfer positive current to flow through the secondary transfer roller 906, the ITB 900 and the photosensitive drum 908 into the GND of the photosensitive drum 908. The secondary transfer positive current, having flown into the GND of the photosensitive drum 908, passes from the GND of the current detection circuit 107 through this current detection circuit 107 and the bleeder resistor 235 and returns to the capacitor 254 in the flyback transformer 202.

A charge pump of the capacitor 263 causes the ITB cleaning positive current to flow through the ITB cleaning brush 916, the ITB 900 and the photosensitive drum 908 into the GND of this photosensitive drum 908. The ITB cleaning positive current, having flown into the GND of the photosensitive drum 908, passes from the GND of the current detection circuit 137 through this current detection circuit 137 and the bleeder resistor 234 and returns to the capacitor 263.

A charge pump of the capacitor 278 causes the secondary transfer negative current to flow into the current detection circuit 107 and the GND of this current detection circuit 107. The secondary transfer negative current, having flown into the GND of the current detection circuit 107, passes from the GND of the photosensitive drum 908 through this photosensitive drum 908, the ITB 900, the secondary transfer roller 906 and the bleeder resistor 206 in the flyback transformer 202 and returns to the capacitor 278.

Likewise, a charge pump of the capacitor 275 causes the ITB cleaning negative current to flow into the current detection circuit 137 and the GND of this current detection circuit 137. The ITB cleaning negative current, having flown into the GND of the current detection circuit 237, passes from the GND of the photosensitive drum 908 through this photosensitive drum 908, the ITB 900, the ITB cleaning brush 916 and the bleeder resistor 205 and returns to the capacitor 275.

Also in the present embodiment, the diodes 273 and 277 separate the current paths for the secondary transfer power supply and the ITB cleaning power supply from each other. The present embodiment also has a restriction analogous to the restriction of Embodiment 1. That is, the maximum voltage of the positive power supply decreases, and the circuit configuration has only one negative power supply. Accordingly, the secondary transfer negative voltage and the ITB cleaning negative voltage cannot be set to voltages different from each other. There is another restriction in that, in the case where the secondary transfer voltage and the ITB cleaning voltage have polarities different from each other, the currents cannot be detected. On this point, in consideration of the cleaning sequence, in the case where the secondary transfer voltage and the ITB cleaning voltage have the different polarities, the current detection is unnecessary. Furthermore, since the use of the negative voltage is for cleaning, the negative voltage does not require strict accuracy in comparison with the positive voltage used for image forming. This point is also analogous to Embodiment 1.

As described above, the present embodiment can reduce the number of power supplies by sharing the high voltage power supply, while maintaining the output function of the high voltage power supply of the image forming apparatus. In the present embodiment, the output of the negative power supply is superposed on the secondary transfer positive power supply and the ITB cleaning positive power supply via the two rectification circuits connected in parallel to the single negative power supply, and the current paths of the secondary transfer current and the ITB cleaning current are separated from each other. This configuration can reduce the negative power supplies and the signal ports for the negative power supplies, which in turn can further reduce the cost of the circuits and the size of the substrate.

Furthermore, the present embodiment adopts the flyback transformer for the secondary transfer positive power supply, and the piezoelectric transformer for the ITB cleaning positive power supply and the negative power supply. This configuration increases in size in comparison with Embodiment 1 adopting the multistage voltage doubler rectification circuit. However, this configuration can increase the output of the power supply. Accordingly, this configuration is suitable for a high speed image forming apparatus that requires a high voltage.

Embodiment 3 will now be described.

Overview of Primary Transfer Power Supply

Figure 7:
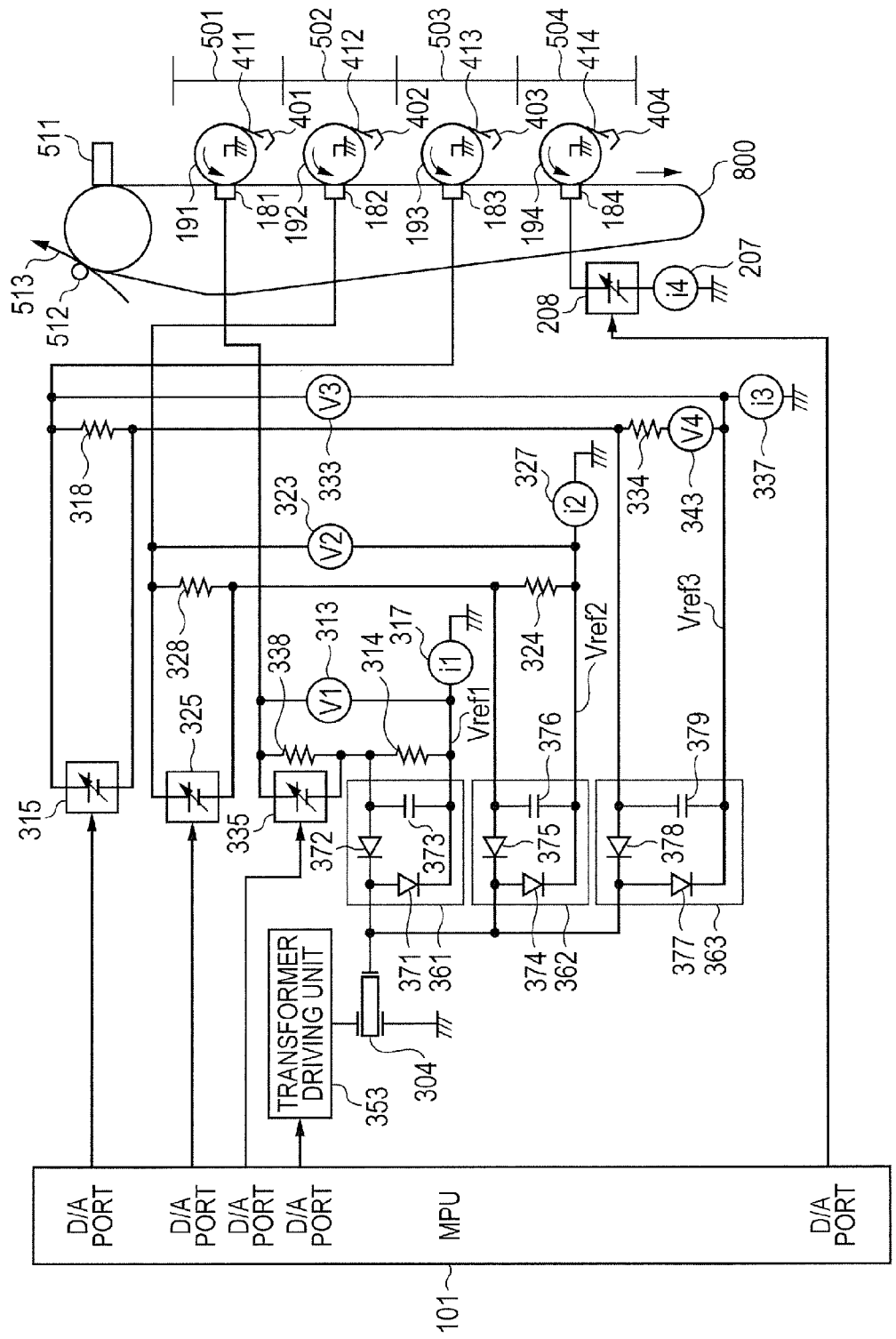
FIG. 7 is a diagram illustrating a configuration of a primary transfer power supply of Embodiment 3.

FIG. 7 is a schematic diagram illustrating a primary transfer power supply in an in-line image forming apparatus where color image forming units (also referred to as stations) are arranged according to the present embodiment. The present embodiment is different from Embodiments 1 and 2 in that a configuration of sharing a negative power supply with respect to positive power supplies is applied to a primary transfer power supply, and the output of the single shared negative power supply is superposed on the outputs of the three primary transfer positive power supplies.

In FIG. 7, the image forming apparatus includes four image forming units (also referred to as stations) sequentially disposed in a downstream direction of an intermediate transfer belt (ITB) 800. These units are a first station 501, a second station 502, a third station 503 and a fourth station 504. Photosensitive drums 191 to 194 are image bearing members of the respective stations. These drums are rotationally driven by a driving unit, not illustrated, in the direction of an arrow (counterclockwise). The stations include charge apparatuses (not illustrated), exposure apparatuses (not illustrated), developing apparatuses (not illustrated), used toner bottles 401 to 404 and cleaning blades 411 to 414, around the respective photosensitive drums 191 to 194. Toner images formed on the photosensitive drums 191 to 194 by the charge apparatuses, the exposure apparatuses and the developing apparatuses are transferred onto the ITB 800 by voltages applied to respective primary transfer pads 181 to 184. Subsequently, a recording medium 513 is conveyed to a contact part between the ITB 800 and the secondary transfer roller 512, while a voltage is applied to the secondary transfer roller 512. Thus, the toner images on the ITB 800 are transferred onto the recording medium 513. The toner that has not been transferred onto the recording medium 513 and remains on the ITB 800 is temporarily collected by an ITB cleaning apparatus 511 from the ITB 800.

Primary transfer positive power supplies 315, 325, 335 and 208 internally include (not illustrated): a transformer driving circuit that drives a transformer according to a control signal from the MPU 101; the transformer that generates an output voltage; and a rectification circuit that rectifies the output voltage of the transformer. The primary transfer positive power supplies 315, 325, 335 and 208 apply positive voltages to the primary transfer pads 183, 182, 181 and 184 of the respective stations according to control signals (analog signals) from the MPU 101 via D/A ports. These pads are connected to the respective primary transfer positive power supplies in a one-to-one correspondence. Resistors 318, 328 and 338 are bleeder resistors.

The transformer driving unit 353 drives a piezoelectric transformer 304. The driving unit drives the piezoelectric transformer 304 at a frequency based on a control signal (frequency setting signal) input from a D/A port of the MPU 101 to output a predetermined voltage. The piezoelectric transformer 304 comes into the on state according to control by the transformer driving unit 353, and applies a negative voltage to the primary transfer pads 181 to 183. The piezoelectric transformer 304 comes into the on state according to control by the transformer driving unit 353, and applies a negative voltage to the primary transfer pads 181, 182 and 183 corresponding to the first, second and third stations via the respective rectification circuits 361, 362 and 363. The rectification circuit 361 includes diodes 371 and 372 and a capacitor 373. The rectification circuit 362 includes diodes 374 and 375 and a capacitor 376. The rectification circuit 363 includes diodes 377 and 378 and a capacitor 379. The rectification circuits 361, 362 and 363 rectify the output from the piezoelectric transformer 304, and apply negative voltages to the respective primary transfer pads 181, 182 and 183 corresponding to the first, second and third stations. Resistors 314, 324 and 334 are bleeder resistors.

Voltage detection circuits 313, 323 and 333 resistance-divide positive voltages to the primary transfer pads 181, 182 and 183 of the first, second and third stations, and feed the voltages back (not illustrated) to the respective corresponding primary transfer positive power supplies 335, 325 and 315 to perform constant voltage control. A voltage detection circuit 343 resistance-divides an anode voltage of the diode 378 and feeds the voltage back (not illustrated) to the transformer driving unit 353 to perform constant voltage control.

Current detection circuits 317, 327, 337 and 207 detect load currents flowing through the respective primary transfer pads 181 to 184 of the first to fourth stations. The detected values of the load currents are output as analog signals to A/D ports (not illustrated) of the MPU 101. Reference voltages Vref1, Vref2 and Vref3 are voltages on ungrounded sides of the respective current detection circuits 317, 327 and 337.

The present embodiment is analogous to Embodiments 1 and 2 in restrictions of current paths and power supplies and in that the process does not require a strict accuracy of a negative voltage. This embodiment is different from Embodiments 1 and 2 only in the number of positive power supplies and in that the number of rectification circuits of the negative power supply, which is two in each of Embodiments 1 and 2 and changed to three in this embodiment. Accordingly, detailed description thereof is omitted.

Control of Applying Primary Transfer Voltage

Control of applying a primary transfer voltage according to the present embodiment will now be described. In image forming, positive voltages are applied to the primary transfer pads. Accordingly, toner images formed on the photosensitive drums 191 to 194 are transferred onto the ITB 800. Meanwhile, in a cleaning sequence, positive voltages are applied to the primary transfer pads. Accordingly, used toner having the positive polarity is moved to the photosensitive drums 191 to 194, and the used toner is collected into the respective used toner bottles 401 to 404. In contrast, negative voltages are applied to the primary transfer pads, thereby dividing the used toner into the stations.

In image forming, toner that has not been transferred by the secondary transfer roller 512 onto the recording medium 513 and remains on the ITB 800 is temporarily collected into the ITB cleaning apparatus 511. In the cleaning sequence, the toner having been collected into the ITB cleaning apparatus 511 is caused to have the positive polarity, and discharged onto the ITB 800. In the cleaning sequence, the used toner is processed according to any of two cases. In one case, a positive voltage is applied to the primary transfer pads, thereby causing the used toner to repel against the ITB 800 and return to the photosensitive drums. In the other case, a negative voltage is applied, thereby allowing the used toner to be absorbed by the ITB 800 and to flow toward the downstream station. The MPU 101 performs control of dividing the used toner, where the used toner flow toward the downstream station, such that the amounts of used toner collected by the first to fourth stations do not exceed permissible amounts of the respective used toner bottles 401 to 404. The downstream-most fourth station 504 does not have a downstream station, to which the used toner to flow. This configuration negates the need to apply a negative voltage to the fourth station 504. Accordingly, only a positive power supply 208 is connected to the primary transfer pad 184. In the cleaning sequence, the MPU 101 applies a positive voltage to the ITB cleaning apparatus 511 to allow this ITB cleaning apparatus 511 to discharge the temporarily collected toner onto the ITB 800. In consideration of time of applying the positive voltage, the MPU 101 determines whether to move the used toner, having moved onto the ITB 800, further onto the photosensitive drums of the respective stations or not to move but allow the used toner to pass the stations. That is, the MPU 101 determines timing of applying voltages to the primary transfer pads of the respective stations. According to the timing, the used toner having moved onto the ITB 800 is collected at the stations by applying the positive voltage, or the used toner passes therethrough toward the downstream station by applying the negative voltage. At this time, as with Embodiments 1 and 2, the cleaning sequence does not require current detection, and does not demand strict voltage accuracy for the negative voltage. Accordingly, as illustrated in FIG. 7, the power supply configuration is applicable in which the negative voltage are shared among the primary transfer pads at the first to the third stations.

Current Paths and Current Detection of Primary Transfer Power Supply

In FIG. 7, the primary transfer positive current flowing to the primary transfer pad 181 of the first station 501 flows from the primary transfer positive power supply 335 through the primary transfer pad 181, ITB 800 and the photosensitive drum 191 into the GND of this photosensitive drum 191. The primary transfer positive current, having flown into the GND of the photosensitive drum 191, passes from the GND of the current detection circuit 317 through this current detection circuit 317 and the bleeder resistor 314 and returns to the primary transfer positive power supply 335. The primary transfer negative current flowing to the primary transfer pad 181 of the first station 501 flows into the current detection circuit 317 and the GND of this current detection circuit 317 by the charge pump of the capacitor 373 of the rectification circuit 361. The primary transfer negative current, having flown into the GND of the current detection circuit 317, passes from the GND of the photosensitive drum 191 through this photosensitive drum 191, the ITB 800, the primary transfer pad 181 and the bleeder resistor 338 and returns to the capacitor 373. As with the current path at the first station, the primary transfer positive and negative currents flowing through the primary transfer pads 182 and 183 of the second and third stations 502 and 503 flow through the current paths corresponding to the respective stations. No negative voltage is applied to the primary transfer pad 184 of the fourth station 504. Accordingly, only the primary transfer positive current flows therethrough. The MPU 101 causes the current detection circuit, which is for detecting a current flowing through the primary transfer pad at each station, to detect a current at the station for primary transfer. Accordingly, an optimal primary transfer voltage can be selected.

As described above, the present embodiment can reduce the number of power supplies by sharing the high voltage power supply, while maintaining the function of the image forming apparatus that supplies a high voltage. In the present embodiment, the output of the negative power supply is superposed on the primary transfer positive power supplies via the three rectification circuits connected in parallel to the single negative power supply, and the primary transfer currents at the respective stations are separated from each other. This configuration can reduce the negative power supplies and the signal ports for the negative power supplies, which in turn can further reduce the cost of the circuits and the size of the substrate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-199738, filed Sep. 13, 2011, and Japanese Patent Application No. 2012-155603, filed Jul. 11, 2012 which are hereby incorporated by reference herein in their entirety.

What is claimed is:

1. A high voltage power supply comprising:
a first high voltage output unit that outputs a high voltage having a negative polarity;
a second high voltage output unit that outputs a high voltage having a positive polarity; and
a third high voltage output unit that outputs a high voltage having a positive polarity,
a first rectification element connected between the first high voltage output unit and the second high voltage output unit; and
a second rectification element connected between the first high voltage output unit and the third high voltage output unit,
wherein in a case where a voltage is output from the first high voltage output unit to a load, a first current path and a second current path are formed, wherein a negative current flows in the first current path from the load to the first high voltage output unit through the first rectification element and a negative current flows in the second current path from the load to the second high voltage output unit through the second rectification element.

2. The high voltage power supply according to claim 1, further comprising a first current detection unit that detects a current flowing to the second high voltage output unit; and a second current detection unit that detects a current flowing to the third high voltage output unit,
wherein the first current detection unit is connected between the first rectification element and a grounding point, and the second current detection unit is connected between the second rectification element and the grounding point.

3. The high voltage power supply according to claim 1, wherein the first high voltage output unit includes a multi-stage voltage doubler rectification unit.

4. The high voltage power supply according to claim 3, wherein the rectification elements include a diode.

5. The high voltage power supply according to claim 1, wherein the first high voltage output unit includes a piezo-electric transformer.

6. The high voltage power supply according to claim 5, wherein the rectification unit includes a diode and a capacitor.

7. An image forming apparatus comprising:
an image forming unit that forms an image; and
a high voltage power supply that supplies the image forming unit with a high voltage,
wherein the high voltage power supply includes:
a first high voltage output unit outputting a high voltage having a negative polarity;
a second high voltage output unit that outputs a high voltage having a positive polarity; and
a third high voltage output unit that outputs a high voltage having a positive polarity,
a first rectification element connected between the first high voltage output unit and the second high voltage output unit; and
a second rectification element connected between the first high voltage output unit and the third high voltage output unit,
wherein in a case where a voltage is output from the first high voltage output unit to a load, a first current path and a second current path are formed, wherein a negative current flows in the first current path from the load to the first high voltage output unit through the first rectification element and a negative current flows in the second current path from the load to the second high voltage output unit through the second rectification element.

8. The image forming apparatus according to claim 7, further comprising a first current detection unit detects a current flowing to the second high voltage output unit; and a second current detection unit detecting a current flowing to the third high voltage output unit,
wherein the first current detection unit is connected between the first rectification element and a grounding point, and the second current detection unit is connected between the second rectification element and the grounding point.

9. The image forming apparatus according to claim 7, wherein the image forming unit includes:
an image bearing member that bears an image;
a transfer unit that transfers the image on the image bearing member onto a recording medium; and
a cleaning unit that cleans the image bearing member, and
a high voltage from the first high voltage output unit is supplied to the transfer unit and the cleaning unit.

10. The image forming apparatus according to claim 9, wherein a high voltage from the second high voltage output unit is supplied to the cleaning unit, and a high voltage from the third high voltage output unit is supplied to the transfer unit.

11. The image forming apparatus according to claim 9, further comprising a photosensitive member on which an image is formed,
wherein the image bearing member is an intermediate transfer member onto which the image formed on the photosensitive member is transferred.

12. The image forming apparatus according to claim 7, wherein the image forming unit includes a plurality of transfer units for forming images having colors different from each other on the image bearing member, and
the first high voltage output unit supplies the transfer units with a high voltage.

13. The image forming apparatus according to claim 12, further comprising a plurality of photosensitive members on which respective images having colors different from each other are formed,
wherein the image bearing member is an intermediate transfer member onto which the images that have the colors different from each other and are formed on the plurality of photosensitive members are transferred.

* * * * *